United States Patent Office 2,749,233
Patented June 5, 1956

2,749,233

WATER-SOLUBLE, NITROGEN-PHOSPHORUS-CONTAINING PRODUCT AND PROCESS OF MAKING SAME

John E. Malowan, Dayton, Ohio, assignor to Monsanto Chemical Company, St. Louis, Mo., a corporation of Delaware No Drawing. Application January 27, 1953,
Serial No. 333,602

6 Claims. (Cl. 71—42)

This invention relates to a process for the preparation of water-soluble nitrogen-phosphorus-containing products and to the compositions thus produced. The products of the present invention have utility as fertilizers, as water softeners and in flame-proofing compositions.

It has been found that the water-insoluble reaction products of phosphorus oxychloride and ammonia which have been prepared at temperatures above 155° C. but below 250° C. may be changed to a water-soluble phosphorus-nitrogen-containing product which is substantially neutral or slightly alkaline in reaction by the process herein disclosed.

A class of reaction products obtained by the reaction of phosphorus oxychloride with anhydrous ammonia are described in U. S. Patent 2,596,935. While these products as thus described are essentially water-insoluble they have been successfully employed as fire-retardants. In order, however, to increase the ease of application of such products it has long been desired to prepare such materials in water-soluble form.

I have now discovered that the originally water-insoluble form of the heat-treated condensation product of phosphorus oxychloride with anhydrous ammonia may be rendered water-soluble by heating the same with a restricted amount of water. By such treatment at elevated temperatures a chemical reaction takes place, the nature of which is not fully understood, but is manifested by the liberation of a considerable amount of heat and the formation of the product in water-soluble form.

The present process is carried out preferably by heating the water-insoluble form referred to above with from 10% to 30% of its weight of water. The temperature of heating may be between 80° C. and 150° C. with the preferred temperature range being from 90° C. to 130° C. The reaction is carried out advantageously in a closed vessel capable of withstanding pressures which may reach two or more atmospheres. Ammonia is liberated during the reaction and while it is generally desirable to retain the ammonia in the vessel during the major part of the reaction some may be removed in order to prevent the pressure from reaching excessive levels.

The reaction may be carried out using water only. However, somewhat faster rates of reaction may be obtained by employing catalysts. Catalysts for this reaction may be acids or alkalies, for example, mineral acids such as hydrochloric acid, nitric acid, sulfuric acid, phosphoric acid, etc., or alkalies such as sodium hydroxide, potassium hydroxide, ammonia, etc. Usually an amount of catalyst from 0.5% to 5.0% by weight of the starting material is sufficient.

The hydrolyzed material which is obtained by the process of the present invention is a water-soluble composition comprising essentially nitrogen and phosphorus. This product is free from ortho-phosphoric acid as shown by the test with silver nitrate reagent. Aqueous solution in any desired concentration may be prepared because of the ease of solubility of the hydrolyzed material so that a 50% by weight solution may easily be obtained at room temperature. The solution has a relatively high viscosity, so that it may readily be applied in industrial processes to permit a substantial add-on on any desired base material, such as in flameproofing applications.

The hydrolyzed material may be separated in gel form by precipitation from its aqueous solution by the addition thereto of acetone, alcohol or other organic solvents in which the hydrolyzed product is itself insoluble. The gel material thus obtained may be dried to a white amorphous mass which, however, retains its solubility in water.

The hydrolyzed soluble product has the property of sequestering calcium and magnesium ions from solutions so that the material may be utilized as a water softening agent. In the same manner the hydrolyzed material may also be applied in combination with conventional water-treating chemicals to accomplish a particular result with any water which must be treated for industrial use.

The following example illustrates the present invention:

*Example 1*

Three hundred grams of insoluble high molecular weight phosphorus-nitrogen-containing product obtained by the process described in Patent No. 2,596,935 was mixed with 70 cc. of water in a ball mill and the mixture then placed in an autoclave which was heated by means of an oil bath. Upon the application of heat to the mixture, the pressure gauge of the autoclave was observed, and the increase of pressure noted as an indication of gas evolution during the hydrolysis of the starting material. The pressure rose to 180 pounds per square inch and the autoclave temperature reached 135° C. After the cessation of the reaction the product was cooled in the autoclave and the gas pressure released. Upon removal from the autoclave the reacted material was found to be a sintered, porous mass which was substantially completely soluble in water at room temperature and was free of orthophosphate. The product is substantially neutral to slightly alkaline, as shown by its pH, which is in the range of about 7.0 to 7.5.

The molecular weight of the water-soluble product is in the range of from 200 to 250. The nitrogen content of the product varies from 18% to 25% by weight and the phosphorus content from 27% to 32%, so that the nitrogen-phosphorus weight ratio is in the range of 1.25:1 to 1.9:1.

*Example 2*

The method of Example 1 is repeated using 2% of sulfuric acid as a catalyst. The product obtained is similar to that of Example 1.

*Example 3*

The method of Example 1 is repeated using 2% of sodium hydroxide as a catalyst. The product obtained is similar to that of Example 1.

The product of the present invention may be used for various purposes. Since it is a source of readily available phosphorus and nitrogen in soluble form, it may be employed as a fertilizer, particularly in applications in which a rapid response or stimulation is desired.

In view of the high viscosity of the aqueous solutions of the present product, it also may be employed as a viscosity modifier to increase the viscosity of various aqueous solutions.

It may also be employed as a fireproofing or glowproofing material as described and claimed in application Serial No. 333,061, filed January 27, 1953, which application is assigned to the same assignee as is the present case.

What is claimed is:

1. The process for preparing a water-soluble nitrogen-phosphorus-containing product from the water-insoluble high molecular weight reaction product of phosphorus oxychloride and anhydrous ammonia obtained at a temperature in the range of from 155° C. to 250° C., which comprises hydrolyzing the said reaction product by contacting the same with from 10% to 35% by weight of water at a temperature in the range of from 80° C. to 150° C. in a closed vessel.

2. The process for preparing a water-soluble nitrogen-phosphorus-containing product from the water-insoluble high molecular weight reaction product of phosphorus oxychloride and anhydrous ammonia obtained at a temperature in the range of from 155° C. to 250° C., which comprises hydrolyzing the said reaction product by contacting the same with from 15% to 20% by weight of water at a temperature in the range of from 85° C. to 135° C. in a closed vessel.

3. The process for preparing a water-soluble nitrogen-phosphorus-containing product from the water-insoluble high molecular weight reaction product of phosphorus oxychloride and anhydrous ammonia obtained at a temperature in the range of from 155° C. to 250° C., which comprises hydrolyzing the said reaction product by contacting the same in a closed vessel with from 10% to 35% by weight of water at a temperature in the range of from 80° C. to 150° C. in the presence of mineral acid.

4. The water-soluble, nitrogen-phosphorus-containing product obtained from the water-insoluble high molecular weight reaction product of phosphorus oxychloride and anhydrous ammonia, the said reaction product being prepared at a temperature in the range of from 155° C. to 250° C., by hydrolyzing the said reaction product by contacting the same with from 10 per cent to 35 per cent by weight of water at a temperature in the range of from 80° C. to 150° C. in a closed vessel.

5. The water-soluble, nitrogen-phosphorus-containing product obtained from the water-insoluble high molecular weight reaction product of phosphorus oxychloride and anhydrous ammonia prepared at a temperature in the range of from 155° C. to 250° C., by the hydrolysis of the said reaction product by contacting the same from 15 per cent to 20 per cent by weight of water at a temperature in the range of from 85° C. to 135° C. in a closed vessel.

6. The water-soluble, nitrogen-phosphorus-containing product obtained from the water-insoluble high molecular weight reaction product of phosphorus oxychloride and anhydrous ammonia, prepared at a temperature in the range of from 155° C. to 250° C., by hydrolyzing the said reaction product in a closed vessel by contacting the same with from 10 per cent to 35 per cent by weight of water at a temperature in the range of from 80° C. to 150° C. in the presence of mineral acid.

References Cited in the file of this patent

UNITED STATES PATENTS 2,596,935　　Malowan et al. _____ May 13, 1952